(12) United States Patent
Geiser

(10) Patent No.: US 8,904,894 B2
(45) Date of Patent: Dec. 9, 2014

(54) BACKLASH-COMPENSATING MOBILE

(75) Inventor: Sylvain Geiser, Aire-la-Ville (CH)

(73) Assignee: Patek Philippe SA Geneve, Geneva (CH)

( * ) Notice: Subject to any disclaimer, the term of this patent is extended or adjusted under 35 U.S.C. 154(b) by 250 days.

(21) Appl. No.: 13/574,099

(22) PCT Filed: Jan. 7, 2011

(86) PCT No.: PCT/IB2011/000016
§ 371 (c)(1),
(2), (4) Date: Aug. 13, 2012

(87) PCT Pub. No.: WO2011/095851
PCT Pub. Date: Aug. 11, 2011

(65) Prior Publication Data
US 2012/0291576 A1 Nov. 22, 2012

(30) Foreign Application Priority Data
Feb. 2, 2010 (EP) .................................... 10001009

(51) Int. Cl.
| F16H 57/12 | (2006.01) |
| G04B 19/25 | (2006.01) |
| G04B 13/02 | (2006.01) |
| F16H 55/16 | (2006.01) |
| F16H 55/18 | (2006.01) |
| G04B 35/00 | (2006.01) |

(52) U.S. Cl.
CPC .............. *G04B 13/027* (2013.01); *F16H 55/16* (2013.01); *F16H 55/18* (2013.01); *G04B 35/00* (2013.01)
USPC ............................................. 74/409; 368/38

(58) Field of Classification Search
CPC ....... F16H 55/18; F16H 55/16; F16H 31/005; F16H 1/16; F16H 48/12; F16H 37/00; F16H 19/04; F16H 1/227

USPC .............. 74/409, 411, 440, 457, 461; 368/38, 368/202
See application file for complete search history.

(56) References Cited

U.S. PATENT DOCUMENTS 7,258,037 B2 * 8/2007 Wiederrecht ................... 74/461
8,011,267 B2 * 9/2011 Scheufele ....................... 74/461

(Continued)

FOREIGN PATENT DOCUMENTS

EP    2 003 522 A1   12/2008
EP    2 112 567 A1   10/2009

(Continued)

OTHER PUBLICATIONS

International Search Report, dated May 24, 2011, from corresponding PCT application.

*Primary Examiner* — Troy Chambers
*Assistant Examiner* — Jude Agendia
(74) *Attorney, Agent, or Firm* — Young & Thompson

(57) ABSTRACT

A backlash-compensating mobile (1) intended to form a gear with a second mobile (2) and having rigid teeth (4, 5) and backlash-compensating leaf springs (16), is characterized in that the rigid teeth (4, 5) are distributed in groups of consecutive teeth, each group having a first rigid tooth (4) and a second rigid tooth (5) having respective mutually facing meshing flanks (10, 11) to permit the displacement of the second mobile (2) in both directions, and in that the leaf springs (16) are interleaved between these groups in spaces not intended to receive the teeth (3) of the second mobile (2), and extend beyond the tip circle (Ca) of the rigid teeth (4, 5) in order to cooperate with the second mobile (2).

16 Claims, 1 Drawing Sheet

(56) References Cited

U.S. PATENT DOCUMENTS

| | | | |
|---|---|---|---|
| 8,042,423 B2 * | 10/2011 | Bannier et al. | 74/461 |
| 2006/0048596 A1 * | 3/2006 | Wiederrecht | 74/461 |
| 2008/0307915 A1 | 12/2008 | Scheufele | |
| 2009/0260470 A1 | 10/2009 | Bannier et al. | |

FOREIGN PATENT DOCUMENTS

| | | |
|---|---|---|
| EP | 1 520 123 B2 | 3/2012 |
| JP | 56 010860 A | 2/1981 |
| JP | 63-130961 A | 6/1988 |
| JP | 2008 189172 A | 8/2008 |

* cited by examiner

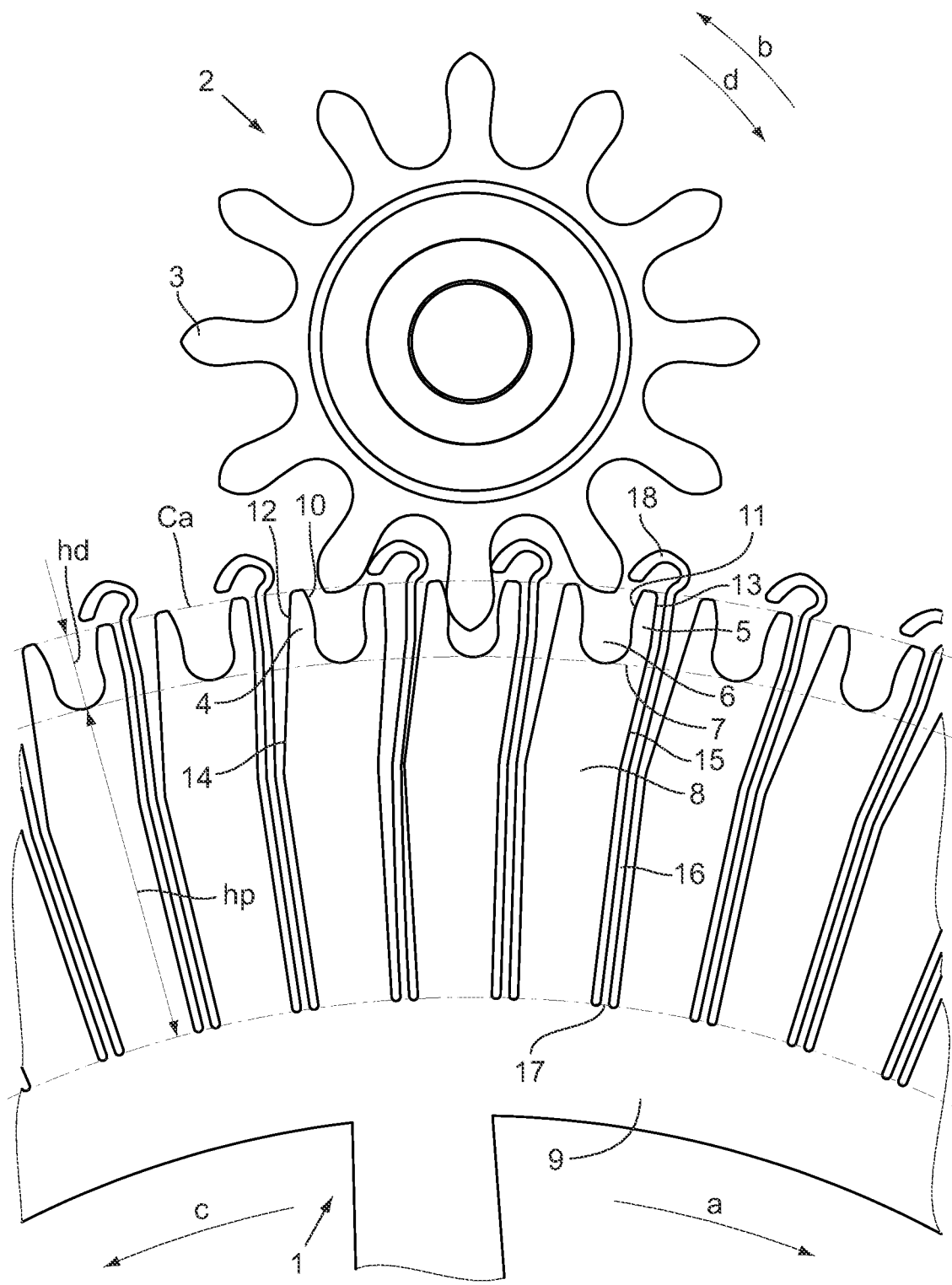

BACKLASH-COMPENSATING MOBILE

The present invention relates to the field of gears, in particular in horology. The present invention relates more particularly to a backlash-compensating mobile for a gear.

In traditional gears, the mutually engaged toothed mobiles necessarily have backlash or play there between in order to make allowance for manufacturing tolerances. Backlash is defined as the difference between the pitch and the sum of the widths of two respective teeth of the mobiles. In the field of horology, the backlash of gears has a detrimental effect on the display precision in that they can cause in particular the indicating hands to tremble.

Backlash-compensating gear mobiles have already been proposed. Patent EP 1520123 describes a gear in which the teeth of one of the wheels are divided into two half-teeth by a radial slot, one of these half-teeth being complete and having a degree of rigidity sufficient to fully ensure the transmission of the forces to which it is subjected, the other half-tooth having a recess which allows it to be resiliently deformed in the event of locking. This gear is designed to operate in one particular direction of rotation. Operating the gear in the other direction seems possible but only with a poor performance since the forces would be transmitted by the resilient half-teeth. This gear is also very prone to manufacturing defects, in particular to variations in the distance between centres. The working range of the resilient half-teeth is in fact relatively limited, so that a distance between centres that is slightly smaller than the theoretical distance between centres of the two wheels risks causing jamming, whilst a distance between centres that is slightly larger than the theoretical distance between centres risks the resilient half-tooth not being engaged and the backlash not being compensated for.

Japanese patent application JP 63-130961 describes a gear wheel whose teeth are slotted either symmetrically, in the case of a bidirectional gear, or asymmetrically, in the case of a unidirectional gear, to allow resilient deformation of the teeth to absorb pitch errors, tooth profile errors or the like. In the case of a unidirectional gear, this gear wheel has the same disadvantages as those mentioned above with respect to document EP 1520123. In the case of the bidirectional gear, the performance is poor in both directions since the forces are transmitted in both directions by the half-teeth which are resiliently deformed.

Patent application EP 2003522 proposes a backlash-compensating toothed mobile for a gear, wherein in the mobile one tooth out of two is fixed and completely rigid, with the other tooth being formed by a leaf spring having a meshing flank. This mobile thus transmits the torque to the other mobile alternately by a rigid tooth and by a resilient tooth. This results in variations in torque and thus in rotational speed which affect the indicating hands and have a consequential negative effect on the display precision. Furthermore, in order to be able to transmit the torque to the other mobile, the resilient teeth cannot have an excessive degree of resiliency. Upon contact between a resilient tooth and a tooth of the other mobile, the relative rigidity of the resilient teeth causes the resilient tooth to press, with a relatively high force, the tooth of the other mobile against a rigid tooth of the backlash-compensating mobile, which produces friction and decreases the performance of the gear. Finally, the shape of the resilient teeth does not appear kinematically to allow bidirectional operation of the gear.

The present invention aims to propose a backlash-compensating mobile for a gear which allows said gear to operate in both directions and to perform well in both directions equally.

To this end, there is provided a backlash-compensating mobile intended to form a gear with a second mobile and having rigid teeth and backlash-compensating leaf springs, characterised in that the rigid teeth are distributed in groups of consecutive teeth, each group having a first rigid tooth and a second rigid tooth having respective mutually facing meshing flanks to permit the displacement of the second mobile in both directions, and in that the leaf springs are interleaved between these groups in spaces not intended to receive the teeth of the second mobile, and extend beyond the tip circle of the rigid teeth in order to cooperate with the second mobile.

Preferably, the free end of the leaf springs, intended to cooperate with the second mobile, is curved in shape.

In accordance with embodiments, the teeth of each group protrude from the upper end of a common foot which connects them to a rim of the backlash-compensating mobile. The height of the feet is preferably at least equal to half the height of the rigid teeth, more preferably at least equal to the height of the rigid teeth, more preferably at least equal to twice the height of the rigid teeth, more preferably at least equal to three times the height of the rigid teeth and more preferably at least equal to four times the height of the rigid teeth.

The present invention also relates to a gear comprising a backlash-compensating mobile as defined above and a second mobile cooperating with the backlash-compensating mobile.

The present invention also relates to a timepiece comprising such a gear.

Other features and advantages of the present invention will become apparent upon reading the following detailed description with reference to the accompanying figure which shows a partial plan view of a gear in accordance with a preferred embodiment of the invention.

This gear comprises a driving toothed wheel 1 engaged with a driven toothed pinion 2. The toothed arrangement of the pinion 2 is traditional and thus has rigid teeth 3 evenly distributed over the periphery of the pinion 2. The toothed arrangement of the wheel 1 is composed of groups of rigid teeth evenly distributed over the periphery of the wheel 1. Each group comprises a first tooth 4 and a second tooth 5 which are consecutive, separated only by an empty space 6, and which protrude from the upper end 7 of a common foot 8 which connects them to the rim 9 of the wheel 1. The teeth 4, 5 have a height hd corresponding to the useful height of a standard tooth. The foot 8 has a height hp greater than the height hd of the teeth 4, 5 and a width, at its upper end 7, substantially equal to the sum of the widths of the teeth 4, 5 and the width of the space 6 between the teeth 4, 5. The entire arrangement formed by the foot 8 and the teeth 4, 5 thus has a great deal of rigidity whilst being of a large height. The teeth 4, 5 have convex, respective, mutually facing meshing flanks 10, 11. The other flanks 12, 13 of the teeth 4, 5 are substantially straight and form extensions of the flanks 14, 15 of the foot 8.

The gear formed by the wheel 1 and the pinion 2 is thus bidirectional. In one direction of rotation of the wheel 1, indicated in the drawing by the arrow a, the first teeth 4 co-operate by way of their meshing flanks 10 with the teeth 3 of the pinion 2 to communicate a force to the pinion 2 causing it to rotate in the direction b. In the other direction of rotation of the wheel 1, indicated in the drawing by the arrow c, the second teeth 5 co-operate by way of their meshing flanks 11 with the teeth 3 of the pinion 2 to communicate a force to the pinion 2 causing it to rotate in the direction d. Thus, the forces are transmitted between the wheel 1 and the pinion 2 in all cases via rigid teeth regardless of the direction of rotation of the gear. The other flanks 12, 13 of the teeth 4, 5 do not have a functional role.

Provided in each space between two consecutive arrangements 4, 5, 8 is a leaf spring 16 attached at a first end 17 to the rim 9 of the wheel 1, wherein the other—free—end 18 is located beyond the tip circle Ca of the teeth 4, 5, i.e., the circle passing through the respective apexes of said teeth. The free ends 18 of the leaf springs 16 are curved in the manner of a hook in order to pass over the second teeth 5 respectively. Thus, the leaf springs 16 can co-operate with the teeth 3 of the pinion 2 simultaneously with the co-operation between these same teeth 3 and the teeth 4 or 5 of the wheel 1.

The function of the leaf springs 16 is to compensate for the backlash of the gear. When the wheel 1 rotates in the direction a, one or more leaf springs 16 act on the pinion 2 to keep a tooth 3 of the pinion 2 in contact with the meshing flank 10 of a tooth 4 of the wheel 1, as shown in the figure. When the wheel 1 rotates in the direction c, the leaf springs 16 cannot overcome the resistance offered by the pinion 2 and the latter is pushed by the meshing flanks 11 of the teeth 5. At the moment when the wheel 1 stops rotating, if the pinion 2 ceases to offer resistance, one or more leaf springs 16 push the latter until one of its teeth 3 abuts against the meshing flank 10 of a tooth 4. Thus, the stopping position of the pinion 2 is stable.

As can be seen in the drawing, the large height of the feet 8 allows the leaf springs 16 themselves to be of a large height which provides them with a great deal of deformability and thus a large working range. The gear thus has very low sensitivity to manufacturing defects, in particular to out-of-roundness of the wheel 1 and pinion 2 and to variations in the distance between centres, i.e., the distance between the respective axes of the wheel 1 and pinion 2. In practice, the height hp of the feet 8 is greater than or equal to half the height hd of the teeth 4, 5. In some embodiments, the height hp is greater than or equal to the height hd. In other embodiments, the height hp is greater than or equal to twice the height hd. In still other embodiments, the height hp is greater than or equal to three times the height hd. Finally, in still other embodiments, the height hp is greater than or equal to four times the height hd.

Instead of the wheel 1 being the driving member and the pinion 2 being driven, the pinion 2 could be the driving member in either of the directions b and d and the wheel 1 could be driven in either of the corresponding directions a and c.

The wheel 1 can be made of metal or silicon and the pinion 2 can be made of metal for example.

The gear in accordance with the invention can be used for example in a timepiece such as a wristwatch.

The invention can be applied to gears with external toothed arrangements, as shown, but also to gears with an internal toothed arrangement such as gears formed by an internal toothed crown and a planet pinion.

The invention claimed is:
1. A backlash-compensating mobile comprising:
a first mobile and a second mobile,
the first mobile having rigid teeth and backlash-compensating leaf springs, wherein:
the rigid teeth are distributed in groups of consecutive teeth, each group having a first rigid tooth and a second rigid tooth,
the first rigid tooth and the second rigid tooth each have a respective mutually facing meshing flanks to permit the displacement of the second mobile in both directions, and
the backlash-compensating leaf springs are interleaved between said groups of consecutive teeth in spaces not intended to receive the teeth of the second mobile, and
a free end of the backlash-compensating leaf springs extends beyond the tip circle of the rigid teeth in order to cooperate with the second mobile.

2. The backlash-compensating mobile as claimed in claim 1, wherein the free end of the leaf springs, intended to cooperate with the second mobile, is curved in shape.

3. The backlash-compensating mobile as claimed in claim 1, wherein the teeth of each group protrude from an upper end of a common foot which connects them to a rim of the backlash-compensating mobile.

4. The backlash-compensating mobile as claimed in claim 3, wherein the height of the feet is at least equal to half the height of the rigid teeth.

5. The backlash-compensating mobile as claimed in claim 3, wherein the height of the feet is at least equal to the height of the rigid teeth.

6. The backlash-compensating mobile as claimed in claim 3, wherein the height of the feet is at least equal to twice the height of the rigid teeth.

7. The backlash-compensating mobile as claimed in claim 3, wherein the height of the feet is at least equal to three times the height of the rigid teeth.

8. The backlash-compensating mobile as claimed in claim 3, wherein the height of the feet is at least equal to four times the height of the rigid teeth.

9. A gear comprising the backlash-compensating mobile as claimed in claim 1.

10. A timepiece comprising the gear as claimed in claim 9.

11. The backlash-compensating mobile as claimed in claim 2, wherein the teeth of each group protrude from an upper end of a common foot which connects them to a rim of the backlash-compensating mobile.

12. The backlash-compensating mobile as claimed in claim 11, wherein the height of the feet is at least equal to half the height of the rigid teeth.

13. The backlash-compensating mobile as claimed in claim 11, wherein the height of the feet is at least equal to the height of the rigid teeth.

14. The backlash-compensating mobile as claimed in claim 11, wherein the height of the feet is at least equal to twice the height of the rigid teeth.

15. The backlash-compensating mobile as claimed in claim 11, wherein the height of the feet is at least equal to three times the height of the rigid teeth.

16. The backlash-compensating mobile as claimed in claim 11, wherein the height of the feet is at least equal to four times the height of the rigid teeth.

* * * * *